(12) United States Patent
Kasahara et al.

(10) Patent No.: US 8,051,412 B2
(45) Date of Patent: Nov. 1, 2011

(54) GLOBAL COMPILER FOR CONTROLLING HETEROGENEOUS MULTIPROCESSOR

(75) Inventors: Hironori Kasahara, Shinjuku-ku (JP); Keiji Kimura, Shinjuku-ku (JP); Hiroaki Shikano, Kokubunji (JP)

(73) Assignee: Waseda University, Tokyo (JP)

( * ) Notice: Subject to any disclaimer, the term of this patent is extended or adjusted under 35 U.S.C. 154(b) by 1176 days.

(21) Appl. No.: 11/716,563

(22) Filed: Mar. 12, 2007

(65) Prior Publication Data

US 2007/0283337 A1 Dec. 6, 2007

(30) Foreign Application Priority Data

Jun. 6, 2006 (JP) ................................. 2006-157308

(51) Int. Cl.
*G06F 9/45* (2006.01)
(52) U.S. Cl. ........................ 717/149; 717/140
(58) Field of Classification Search ........... 717/140–161
See application file for complete search history.

(56) References Cited

U.S. PATENT DOCUMENTS

| | | | | |
|---|---|---|---|---|
| 5,151,991 A * | 9/1992 | Iwasawa et al. | ............... | 717/150 |
| 5,721,928 A * | 2/1998 | Umehara et al. | ............... | 717/149 |
| 5,768,594 A * | 6/1998 | Blelloch et al. | ............... | 717/149 |
| 5,852,734 A * | 12/1998 | Komatsu et al. | ............... | 717/149 |
| 6,292,939 B1 * | 9/2001 | Itou et al. | ............... | 717/149 |
| 6,321,373 B1 * | 11/2001 | Ekanadham et al. | ......... | 717/119 |
| 6,438,747 B1 * | 8/2002 | Schreiber et al. | ............. | 717/160 |
| 7,503,039 B2 * | 3/2009 | Inoue et al. | ................... | 717/154 |
| 2001/0047511 A1 * | 11/2001 | Itou et al. | ......................... | 717/6 |
| 2002/0095666 A1 * | 7/2002 | Tabata et al. | .................. | 717/149 |
| 2003/0110481 A1 * | 6/2003 | Wada et al. | .................... | 717/158 |
| 2005/0081182 A1 | 4/2005 | Minor et al. | | |
| 2005/0086653 A1 * | 4/2005 | Heishi et al. | .................. | 717/151 |
| 2006/0047958 A1 * | 3/2006 | Morais | .......................... | 713/166 |
| 2006/0101430 A1 | 5/2006 | Hayashi | | |
| 2006/0123401 A1 * | 6/2006 | O'Brien et al. | ............... | 717/131 |
| 2007/0038987 A1 * | 2/2007 | Ohara et al. | .................. | 717/151 |
| 2007/0169057 A1 * | 7/2007 | Silvera et al. | ................. | 717/160 |
| 2007/0294680 A1 * | 12/2007 | Papakipos et al. | ............ | 717/149 |

FOREIGN PATENT DOCUMENTS

JP 08-286896 11/1996

(Continued)

OTHER PUBLICATIONS

Alverson et al., "Exploiting Heterogeneous Parallelism on a Multithreaded Multiprocessor," Aug. 1992, ACM, p. 188-197.*

(Continued)

*Primary Examiner* — Wei Zhen
*Assistant Examiner* — Qing Chen
(74) *Attorney, Agent, or Firm* — Stites & Harbison PLLC; Juan Carlos A. Marquez, Esq.

(57) ABSTRACT

Performance of a heterogeneous multiprocessor is reduced as much as possible within a short time without any awareness of parallelization matched with a configuration of the heterogeneous multiprocessor. In a heterogeneous multiprocessor system, tasks having parallelism are automatically extracted by a compiler, a portion to be efficiently processed by a dedicated processor is extracted from an input program being a processing target, and processing time is estimated. Thus, by arranging the tasks according to PU characteristics, scheduling for efficiently operating a plurality of PU's in parallel is carried out.

4 Claims, 15 Drawing Sheets

FOREIGN PATENT DOCUMENTS

| | | |
|---|---|---|
| JP | 2001-175619 | 12/1999 |
| JP | 2004-252728 | 2/2003 |
| JP | 2004-252900 | 2/2003 |

OTHER PUBLICATIONS

Yoshikazu Tanaka et al., "Compiling Techniques for Vector Computers", Information Processing, vol. 31, 6$^{th}$ Edition, Jun. 5, 1990: pp. 736-743, and cover page with English abstract.

D. J. Kuck et al., "Dependence Graphs and Compiler Optimizations", Proceedings of the 8$^{th}$ Annual ACM Symposium on Principles of Programming Languages (1981), pp. 207-218.

"Extending Open MP for Heterogeneous Chip Multiprocessors", Feng Liu and Vipin Chaudhary, Parallel Processing, 2003, Proceedings, 2003 International Conference on Oct. 6-9, 2003, Piscataway, NJ, USA, IEEE, Oct. 6, 2003, pp. 161-168.

Office Action from Japanese Patent Office for Application No. JP-2006-157308, Dated Mar. 22, 2011.

Tsunoda et al., "Overview of Reconfigurable Processor FE-GA for Digital Media", The Institute of Electronics, Information and Communication Engineers, Technical Report, Nov. 24, 2005, 5 pages, including English abstract.

* cited by examiner

```
                                    ┌─ 200
Program_sample () {
/* MT1_1 */
for (j = 0; j < m; j++)   scanf ( %d %d , &a[0][j], &x[j]);

/* MT1_2 */
for (i = 1; i < n; i++) {
/* MT1_2_1 */
for (j = 0; j < m; j++) a[i][j] = a[i   -1][j];

/* MT1_2_2 */
    # pragma hcmp assign drp
    func1(a, b);

/* MT1_2_3 */
    for (j = 0; j < m; j++) d[i][j] = a[i][j] * 2;

/* MT1_2_4 */
    for (j = 0; j < m; j++) e[i][j] = a[i][j] / 2;

/* MT1_2_5 */
    # pramga hcmp assign dsp      ─┐─300
    func3(d, e, f);               ─┐
    }                              ─ 301

/* MT1_3 */
    func4(x, y, z);
} void func4(x, y, z) {

/* MT1_3_1 */
    t = (x(0) + x(m)) / 2
    if (t > g(m/2)) {

/* MT1_3_2 */
    # pragma hcmp assign drp  process_a_01    ─┐─302
    for ( j = 0; j < m; j++)  y[ j ] * 2;  x[ j ] =
    for ( j = 0; j < m; j++)  z[ j ] + 1;  x[ j ] =
    # pragma hcmp assign process_a_01
                                                ─303
    } else {
    /* MT1_3_3 */
    func4b(x, y, z);

/* MT1_3_4 */
    # pragma hcmp assign dsp  process_b_02
    for ( j = 0; j < m; j++)  y[ j ] = x[ j ] + 2;
    for ( j = 0; j < m; j++)  z[ j ] = x[ j ] + 3;
    # pragma hcmp assign process_b_02
    }
}
```

```
pu 0   cpu   clock=2   ldm=128KB, 2cyc   dsm=16KB, 1cyc   icache=8KB, 2way
pu 1   cpu   clock=2   ldm=128KB, 2cyc   dsm=16KB, 1cyc   icache=8KB, 2way
pu 2   cpu   clock=2   ldm=128KB, 2cyc   dsm=16KB, 1cyc   icache=8KB, 2way
pu 3   cpu   clock=2   ldm=128KB, 2cyc   dsm=16KB, 1cyc   icache=8KB, 2way
pu 4   dsp   clock=2   ldm=16KB, 1cyc    dsm=16KB, 1cyc   lpm=8KB, 1cyc
pu 5   dsp   clock=2   ldm=16KB, 1cyc    dsm=16KB, 1cyc   lpm=8KB, 1cyc
pu 6   drp   clock=1   cram=32KB, 1cyc   dsm=16KB, 1cyc
pu 7   drp   clock=1   cram=32KB, 1cyc   dsm=16KB, 1cyc
csm onchip =512KB, 20cyc
csm offchip =128MB, 200cyc
```

FIG. 4

```
Program_sample () {
    /* MT1_1 */
    for ( j = 0; j < m; j++)  scanf ( "%d %d" , &a[0][j], &x[j]);

/* MT1_2 */
    for ( i = 1; i < n; i++) {
    /* MT1_2_1 */
#pragma hcmp exec_cyc dsp exec_cyc=150,000 data_cyc=100,000
        for ( j = 0; j < m; j++) a[i][j] = a[i-1][j];

/* MT1_2_2 */
    # pragma assign drp
      func1(a, b);

/* MT1_2_3 */
#pragma hcmp exec_cyc dsp exec_cyc=350,000 data_cyc=30,000
        for (j = 0; j < m; j++) d[i][j] = a[i][j] * 2;
    /* MT1_2_4 */
#pragma hcmp exec_cyc dsp exec_cyc=400,000 data_cyc=30,000
        for (j = 0; j < m; j++) e[i][j] = a[i][j] / 2;
    /* MT1_2_5 */
#pragma hcmp exec_cyc dsp exec_cyc=800,000 data_cyc=90,000
        # pramga hcmp assign dsp
          func3(d, e, f);
    }

/* MT1_3 */
    func4 (x, y, z);
} void func4(x, y, z) {

/* MT1_3_1 */
    t = (x(0) + x(m )) / 2
    if (t > g(m/2)) {

/* MT1_3_2 */
    # pragma hcmp assign drp
      for ( j = 0; j < m; j++) y[ j ] = x[ j ] * 2;
      for ( j = 0; j < m; j++) z[ j ] = x[ j ] + 1;
      # pragma hcmp assign process_a_01

} else {
        /* MT1_3_3 */
        func4b(x, y, z);
        /* MT1_3_4 */
#pragma hcmp exec_cyc dsp exec_cyc=700,000 data_cyc=20,000
        # pragma hcmp assign dsp process_b_02
          for ( j = 0; j < m; j++) y[j ] = x[j ] + 2;
          for ( j = 0; j < m; j++) z[j ] = x[j ] + 3;
        # pragma hcmp assign process_b_02
    }
}
```

FIG. 6

```
Program_sample () {
    /* MT1_1 */
    for ( j = 0; j < m; j++)  scanf ( %d %d , &a[0][j], &x[j]);
    /* MT1_2 */
    for (i = 1; i < n; i++) {
        /* MT1_2_1 */
#pragma hcmp exec_cyc drp exec_cyc=100,000 data_cyc=10,000 config_cyc=1,000
#pragma hcmp exec_cyc drp exec_cyc=150,000 data_cyc=10,000
        for (j = 0; j < m; j++) a[i][j] = a[i -1][j];
        /* MT1_2_2 */
#pragma hcmp exec_cyc drp exec_cyc=1,500,000 data_cyc=150,000 config_cyc=50,000
        # pragma assign drp
        func1(a, b);
        /* MT1_2_3 */
#pragma hcmp exec_cyc drp exec_cyc=300,000 data_cyc=30,000 config_cyc=1,000
#pragma hcmp exec_cyc drp exec_cyc=350,000 data_cyc=30,000
        for ( j = 0; j < m; j++) d[i][ j ] = a[i][ j ] * 2;
        /* MT1_2_4 */
#pragma hcmp exec_cyc drp exec_cyc=600,000 data_cyc=30,000 config_cyc=5,000
#pragma hcmp exec_cyc drp exec_cyc=400,000 data_cyc=30,000
        for ( j = 0; j < m; j++) e[i][ j ] = a[i][ j ] / 2;
        /* MT1_2_5 */
#pragma hcmp exec_cyc dsp exec_cyc=800,000 data_cyc=90,000
        # pramga hcmp assign dsp
        func3(d, e, f);
    }
    /* MT1_3 */
    func4(x, y, z);
} void func4(x, y, z) {

/* MT1_3_1 */
    t = (x(0) + x(m )) / 2
    if (t > g(m/2)) {
        /* MT1_3_2 */
#pragma hcmp exec_cyc drp exec_cyc=200,000 data_cyc=10,000 config_cyc=3,000
        # pragma hcmp assign drp
        for ( j = 0; j < m; j++)  y[j ] = x[ j ] * 2;
        for ( j = 0; j < m; j++)  z[j ] = x[ j ] + 1;
        # pragma hcmp assign process_a_01
    } else {
        /* MT1_3_3 */
        func4b(x, y, z);
        /* MT1_3_4 */
#pragma hcmp exec_cyc dsp exec_cyc=700,000 data_cyc=20,000
        # pragma hcmp assign dsp process_b_02
        for ( j = 0; j < m; j++)y[j ] = x[ j ] + 2;
        for ( j = 0; j < m; j++)z[j ] = x[ j ] + 3;
        # pragma hcmp assign process_b_02
    }
}
```

FIG. 7

```
Program_sample () {
  /* MT1_1 */
  for ( j = 0; j < m; j++) scanf( "%d %d", &a[0][j], &x[j]);

/* MT1_2 */
  for (i = 1; i < n; i++) {
    /* MT1_2_1 */
    for ( j = 0; j < m; j++) a[i][j] = a[i-1][j];

/* MT1_2_2 */
#pragma hcmp exec_cyc drp exec_cyc=1,500,000 data_cyc=150,000
config_cyc=50,000
    # pragma assign drp
    func1(a, b);

/* MT1_2_3 */
    for ( j = 0; j < m; j++) d[i][j] = a[i][j] * 2;

/* MT1_2_4 */
    for ( j = 0; j < m; j++) e[i][j] = a[i][j] / 2;

/* MT1_2_5 */
#pragma hcmp exec_cyc dsp exec_cyc=800,000 data_cyc=90,000
    # pramga hcmp assign dsp
    func3(d, e, f);
  }

/* MT1_3 */
  func4(x, y, z);
} void func4(x, y, z) {

/* MT1_3_1 */
  t = (x(0) +    x(m  )) / 2
  if (t > g(m/2)) {

/* MT1_3_2 */
#pragma hcmp exec_cyc drp exec_cyc=200,000 data_cyc=10,000 confi g_cyc=3,000
    # pragma hcmp assign drp
    for ( j = 0; j < m; j++) y[ j ] = x[ j ] * 2;
    for ( j = 0; j < m; j++) z[ j ] = x[ j ] + 1;
    # pragma hcmp assign process_a_01

} else {
    /* MT1_3_3 */
    func4b(x, y, z);

/* MT1_3_4 */
#pragma hcmp exec_cyc dsp exec_cyc=700,000 data_cyc=20,000
    # pragma hcmp assign dsp process_b_02
    for ( j = 0; j < m; j++)y[ j ] = x[ j ] + 2;
    for ( j = 0; j < m; j++)z[ j ] = x[ j ] + 3;
    # pragma hcmp assign process_b_02
  }
}
```

FIG. 8

GLOBAL COMPILER FOR CONTROLLING HETEROGENEOUS MULTIPROCESSOR

CLAIM OF PRIORITY

The present application claims priority from Japanese application P2006-157308 filed on Jun. 6, 2006, the content of which is hereby incorporated by reference into this application.

BACKGROUND OF THE INVENTION

This invention relates to a compilation method and a compiler for generating an execution program which enables efficient operations of a plurality of processor units in a multiprocessor system constituted of a plurality of heterogeneous processor units.

Device miniaturization by the advancement of a semiconductor manufacturing technology now enables integration of the huge number of transistors. Simultaneously processor operation frequencies have become higher and higher. However, with an increase of operation power and an increase of standby power caused by a leakage current, the limit has begun to be seen in performance improvement which has been achieved by an increase in operation frequency and improvement of a logical system in the conventional processor. Meanwhile, digital consumer devices including an automobile navigation system, a mobile phone, and a digital television, which simultaneously process a variety of data such as images, voices, and database information, have emerged, and a huge volume of data having different characteristics must be processed with lower power within a short time.

Thus, at present, as means for realizing performance improvement and lower power, a multiprocessor system is promising in that high calculation performance can be obtained by integrating a plurality of general-purpose processors (CPU) conventionally provided in a single chip on a single chip and executing processing in parallel without increasing an operation frequency. In the future, it is expected that further advancement of miniaturization will enable mounting of 100 to 1000 PU's on a chip. Especially, in a system for built-in devices, routine processing of digital signals such as wireless, images, and voices is frequently performed and, as means for achieving both performance improvement and lower power, in addition to a homogeneous multiprocessor system which integrates a plurality of identical general-purpose processors (CPU), i.e., general-purpose processors identical in configuration and calculation performance using identical instruction sets, a heterogeneous multiprocessor (HCMP) system which includes various types of PU's of different instruction sets such as dedicated processors or accelerators capable of executing specific processing highly efficiently (at high speed with lower power) on a single chip in addition to a plurality of CPU's, targets specific applications, and aims at high calculation efficiency has been proposed. An example of a dedicated processor is a dynamically configurable processor (DRP) disclosed in Tsunoda et al., "Outline of Digital Media Reconfiguration Type Processor FE-GA", Technical Report of the Institute of Electronics, Information and Communication Engineers, RECONF-65 (Non-patent Document 1).

In such a multiprocessor system, to obtain calculation performance proportional to the number of PU's, the mounted PU's must be simultaneously operated to process a program. However, as normal input programs are time-sequentially written for processing, it is difficult to obtain expected calculation performance proportional to the number of PUs mounted. As a method for solving the problem, a programmer himself must take parallelism of programs into account, and rewrites original programs by adding parallelization codes to execute the programs by the plurality of PU's based on a configuration of the multiprocessor system for executing the programs. However, while it is effective in the system which includes the plurality of PU's, this method is impractical in development time and effective performance, in a future system which includes several tens to thousands of PU's mounted therein especially a system employing a case of an HCMP constituted of different type of PU's.

(Known Example: Multigrain Parallelization Compiler)

Thus, in the homogeneous multiprocessor system, there has been proposed an automatic parallelization compiler which automatically extracts parallelism of programs, and distributes processing to a plurality of PU's to improve processing performance. That is, studies have been conducted on an automatic parallelization compiler which analyzes input programs, extracts portions operable in parallel from the programs, and allocates the portions to the plurality of PU's to enable simultaneous execution thereof. For example, JP 2004-252728 A discloses a compilation system which analyzes an input source program, divides the program into blocks (tasks) of various particle sizes such as subroutines or loops, analyzes parallelism among the plurality of tasks, divides the tasks and data to be accessed by the tasks into sizes suited to a cache or a local memory, and generates an object program for efficiently operating the multiprocessor system by optimally allocating the tasks to the PU's. Additionally, JP 2001-175619 A discloses an architecture of chip multiprocessor which supports a function of multigrain parallel processing.

(Known Example: Asymmetrical Multiprocessor, Power Scheduling)

Regarding the heterogeneous multiprocessor (HCMP), JP 2004-252900 A discloses, as task allocation means for educing performance of a group of processors different from one another in configuration, a method for dynamically allocating a series of processing to the processors based on information by combining a plurality of processors of different types such as CPU's or DSP's according to processing characteristics in an application in which a processing procedure such as image processing has been determined, and measuring and supplying processing time or power consumption information in the processors beforehand.

(Known Example: Automatic Vector Compiler)

In the HCMP, dedicated execution codes must be generated before types of processors are determined. As generation means, Tanaka and Iwasawa "Compilation Technique for Vector Computer", Information Processing, Vol. 31, 6th edition, Jun. 5, 1990, (Non-patent Document 2) and Kuck, D. J., et al., "Dependence Graphs and Compiler Optimization", Proc. 8th Annual ACM Symposium on Principles of Programming Languages, pp. 177-189 (1981) (Non-patent Document 3) disclose an automatic vector compiler which extracts a vector-calculable portion (loop) from a program through data dependence analysis to generate a vector calculation instruction, for example, when a dedicated processor is a vector calculator.

SUMMARY OF THE INVENTION

At present, to simultaneously process various types of input data by an optimal method, while a new application is emerged to simultaneously process a variety of data such as images, voices or database information in an automobile navigation system, a mobile phone, a digital television, or the like, the HCMP in which the processor includes a plurality of types of PU's is expected to be promising. The conventional multiprocessor system is a homogeneous processor system which includes a plurality of PU's similar in configuration as disclosed in JP 2001-175619 A. However, the inventors have found that to obtain processing performance proportional to the types and the number of mounted PU's in the future heterogeneous multiprocessor system in which various applications are simultaneously processed in a variety of PU's, parallelization and arrangement of programs with the types of PU's taken into consideration will become essential.

Conventionally, to efficiently execute the programs in the plurality of PU's, the programs must be executed to be measured first in the system so that schedule information such as execution time for scheduling application capable of always deciding a small program or a processing sequence fixedly can be obtained, and the developer must manually generate the schedule information based on the measured value. In this case, in the case of a general program whose processing contents or sequence is not known beforehand, especially if a size thereof is large, it is difficult to manually generate the information beforehand. It is similarly difficult to manually generate the information when the types or the number of PU's is increased. Thus, the inventors have found that the general program can be efficiently processed in the multiprocessor constituted of various PU's by, in the case of program compilation, estimating processing time beforehand based on the PU configuration through a compiler, deciding a processing procedure beforehand for portions whose processing sequence can statically decided during the compilation, and generating a program for dynamically scheduling portions whose processing sequence cannot be decided before execution based on processing information containing execution time through the compiler.

It is therefore an object of this invention to enable a user to educe performance of an HCMP as much as possible within a short time without being aware of parallelization matched with the HCMP by providing a compiler for generating codes to be added to an object program and a parallelization compiler system for a heterogeneous multiprocessor system, which enables the optimization, in which, in the HCMP including various PU's, a program portion to be processed by a dedicated processor (or accelerator) of the HCMP is extracted from an input program of a processing target based on user's designation, or a portion to be efficiently executed by the dedicated processor is extracted by the compiler for generating an execution code for the dedicated processor, whereby the parallelization compiler extracts parallel tasks in a form including the designated and extracted tasks and arranges the tasks according to characteristics of the PU's to efficiently operate the PU's, a processing amount of the PU's is estimated, and therefore an operation frequency and a power supply voltage can be optimized.

This invention provides a global compiler which functions as program dividing means matched with processing characteristics of various processor units mounted on a heterogeneous multiprocessor to divide a program in the heterogeneous multiprocessor. The invention also provides a global compiler which functions as means for scheduling the divided programs so that performance of various processor units can be made maximum use of and the divided programs can be efficiently processed by simultaneously operating the plurality of processor units in parallel.

As a specific method therefor, in a heterogeneous multiprocessor including a single or a plurality of types of processor units, the input program is analyzed by a code generation compiler only for the processor units having the input program prepared beforehand for each type of the processor unit of the system, to extract a program portion to be executed for each processor unit, and processing allocated processor information for designating the program portion is generated. Further performed are the processings of: analyzing the input program to extract parallelism of the input program, and allocating (scheduling) the program portion to the processor unit based on the processing allocated processor information; and outputting the allocated program portion as an output code of each processor unit. The object is achieved by a global compiler for a heterogeneous multiprocessor, for causing a computer to execute the processings as described above.

The object is achieved by executing the processing of inserting an input program with the processor information for designating a processor to execute the program portion set as a directive in the global compiler.

The object is achieved by executing the processing of generating execution time, data transfer time, control time or the like as cost information in addition to the processor information when the program is executed by the processor in the global compiler.

Further, the object is achieved by executing the processing of inserting the cost information as a directive into the input program:

According to this invention, in the multiprocessor system which integrates various PU's, by the parallelization method of the plurality of compiler associated programs for dividing and arranging the program for efficiently operating the PU's and generating a control code, efficient processing is enabled with lower power while making maximum use of the performance of the processor system. Further, a software developer can efficiently create a program within a short time without being aware of a processor configuration.

BRIEF DESCRIPTION OF THE DRAWINGS

FIG. 3 is a diagram showing an input program example.

FIG. 4 is a diagram showing configuration information of HCMP1 hardware.

FIG. 6 is a diagram showing an output result of a code generation compiler for a DSP.

FIG. 7 is a diagram showing an output result of a code generation compiler for a DRP.

FIG. 8 is a diagram showing a designation result of cost information for a user designated block.

DETAILED DESCRIPTION OF THE PREFERRED EMBODIMENT

An embodiment of this invention will be described below with reference to the accompanying drawings.

Overall Configuration of Embodiment

As the embodiment of this invention, first, referring to a block diagram of FIG. 1, a configuration of a heterogeneous multiprocessor system (HCMP hereinafter) 1 being an application target of a parallelization compilation system provided by the invention will be described. The HCMP1 includes a plurality of different types of processor units (PU's), and a shared memory (CSM). Each PU is connected to an interconnection network (LBUS). The CSM is connected to the LBUS. A power supply voltage/clock frequency control circuit for supplying a power supply voltage and an operation clock to each unit such as a processor core or a memory of the PU is connected to each PU. According to the embodiment, the types and the number of PU's are two general-purpose processors (CPU), one signal processor (DSP), and two dynamically reconfigurable processors (DRP). However, the embodiment is in no way limitative of the types and the number of PU's, and various configurations can be employed.

Each PU includes a local memory (or cache) (LM) for temporarily storing a program or data processed by the PU, and a frequency/power supply voltage register (FVR) for deciding a power supply voltage or an operation frequency for the PU. The local memory (LM) 24 is divided into a space in which a global address which can be accessed from the other PU and its own PU having the LM is mapped, and a space in which a private address which can be accessed only from the own PU is mapped. The shared memory (CSM) connected to the LBUS has a global address mapped therein, and can be accessed from all the PU's. The application configuration of this invention described above is only an example, and there are other implementation methods. For example, while not shown in FIG. 1, peripheral circuits for I/O processing and interruption processing, a timer, a debug circuit, and the like may be connected to the LBUS as occasion demands. Similar or different types of busses may be connected in a tiered manner via a bus bridge.

Thus, to educe performance of a plurality of types of PU, the PU's must be operated in parallel, and especially, processing capable of efficiently operating the processors must be allocated to the DRP and the DSP being dedicated processors.

(Configuration of Global Compiler)

Figure 2A:
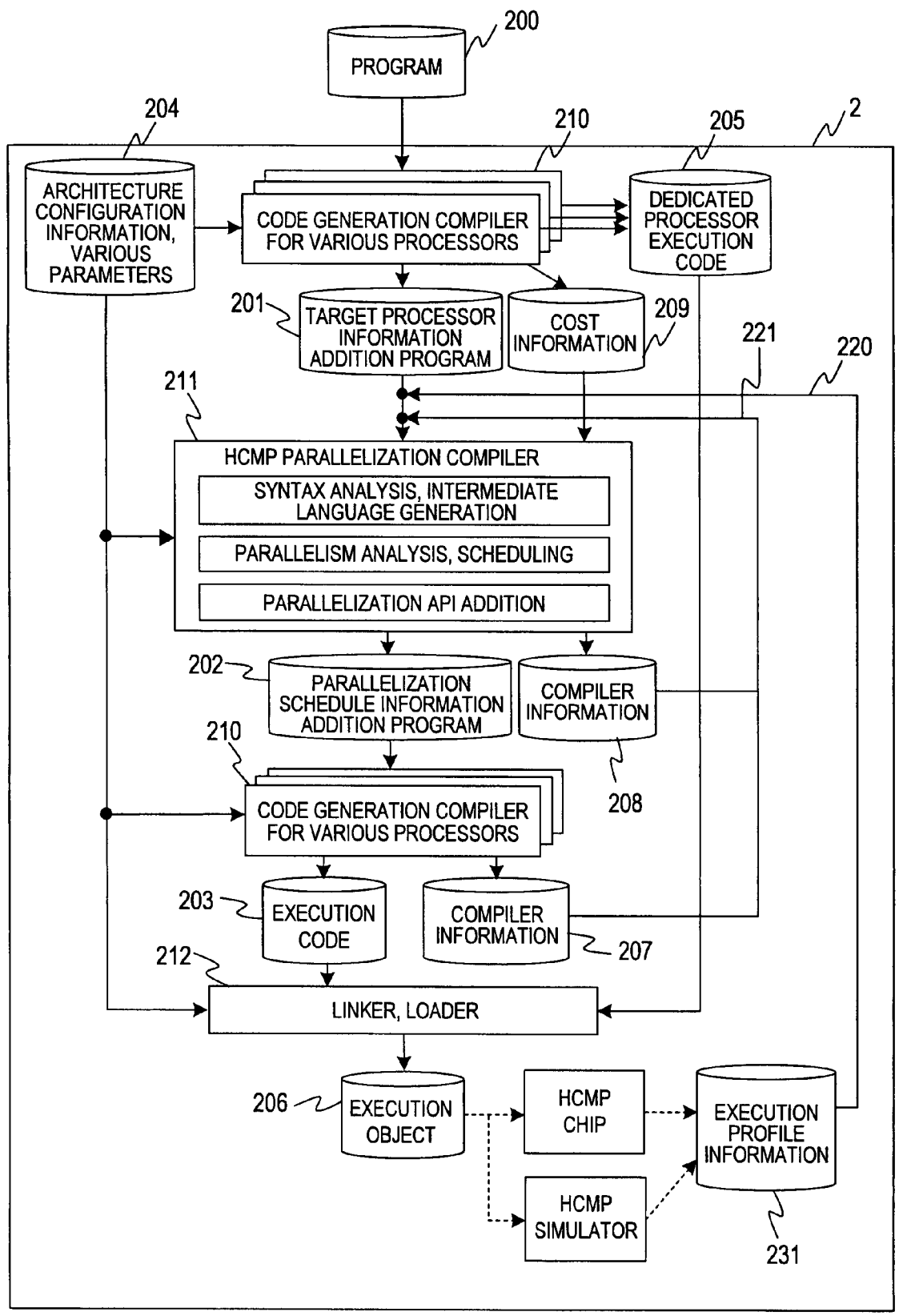
FIG. 2A is a flowchart showing an example of a processing procedure of a global compiler for the HCMP1.

FIG. 2A is a flowchart showing an example of processing of program parallelization and execution code generation for the HCMP1. A program 200 to be input (input program hereinafter) is normally written sequentially. However, in the flowchart, to make maximum use of the PU's of the HCMP1, task division, parallelism analysis, and scheduling of the input program 200 are carried out. According to this invention, a processing procedure of the flowchart of FIG. 2A will be called a global compiler 2. An overall flow of the global compiler 2 shown in FIG. 2A will first be described briefly, and a flow at each compilation stage will be described in detail. The processing shown in FIG. 2A is executed by a computer prepared beforehand.

An input to the global compiler 2 is an input program 200 in which a user sequentially writes processing steps by using a high-level language such as a C language or FORTRAN. Configuration information 204 of the HCMP1 targeted by the global compiler 2 is also input. FIG. 3 shows an example of the input program 200. The input program 200 has a control structure of a loop, a subroutine, or condition branching as shown in the figure, and the parallelization compiler of the HCMP1 executes task division by structure units based on this structure.

(HCMP Architecture Configuration Information)

FIG. 4 shows an example of configuration information of the HCMP1. Architecture information of a configuration of the HCMP1 shown in FIG. 1 is input as parameter information necessary for parallelization of the global compiler beforehand to the architecture configuration information 204 shown in FIG. 2A. As normal parameter information input to the architecture configuration information 204, types and the number of PU's, an operation speed ratio of the PU with a bus, a type of a memory of each PU, a memory size, memory access latency, types of memories of the HCMP1, size, latency, or the like is defined. For example, to explain a meaning of "pu 0 cpu clock=2 ldm=128 KB, 2 cyc dsm=16 KB, 1 cyc icache=8 KB, 2 way" of the first line of FIG. 4 from its head, "PU" indicates a type of a parameter, which represents an attribute of a processor unit in this case. "0" indicates a PU number, and "cpu" indicates that a processor type is a CPU. "clock=2" indicates that a speed ratio of the PU with the bus is double, and "ldm=128 KB, 2 cyc" indicates that a local data memory (LDM) is held, its size is 128 KB, and access latency is 2 cycles.

Additionally, "dsm=16 KB, 1 cyc" indicates that a distributed shared memory is held, its size is 16 KB, and access latency is 1 cycle, and "icache=8 KB, 2 way" indicates that a 2-way instruction cache of 8 KB is provided. The ninth line indicates a concentrated shared memory (CSM) of the HCMP1, and "onchip" means mounting on a chip.

Figure 1:
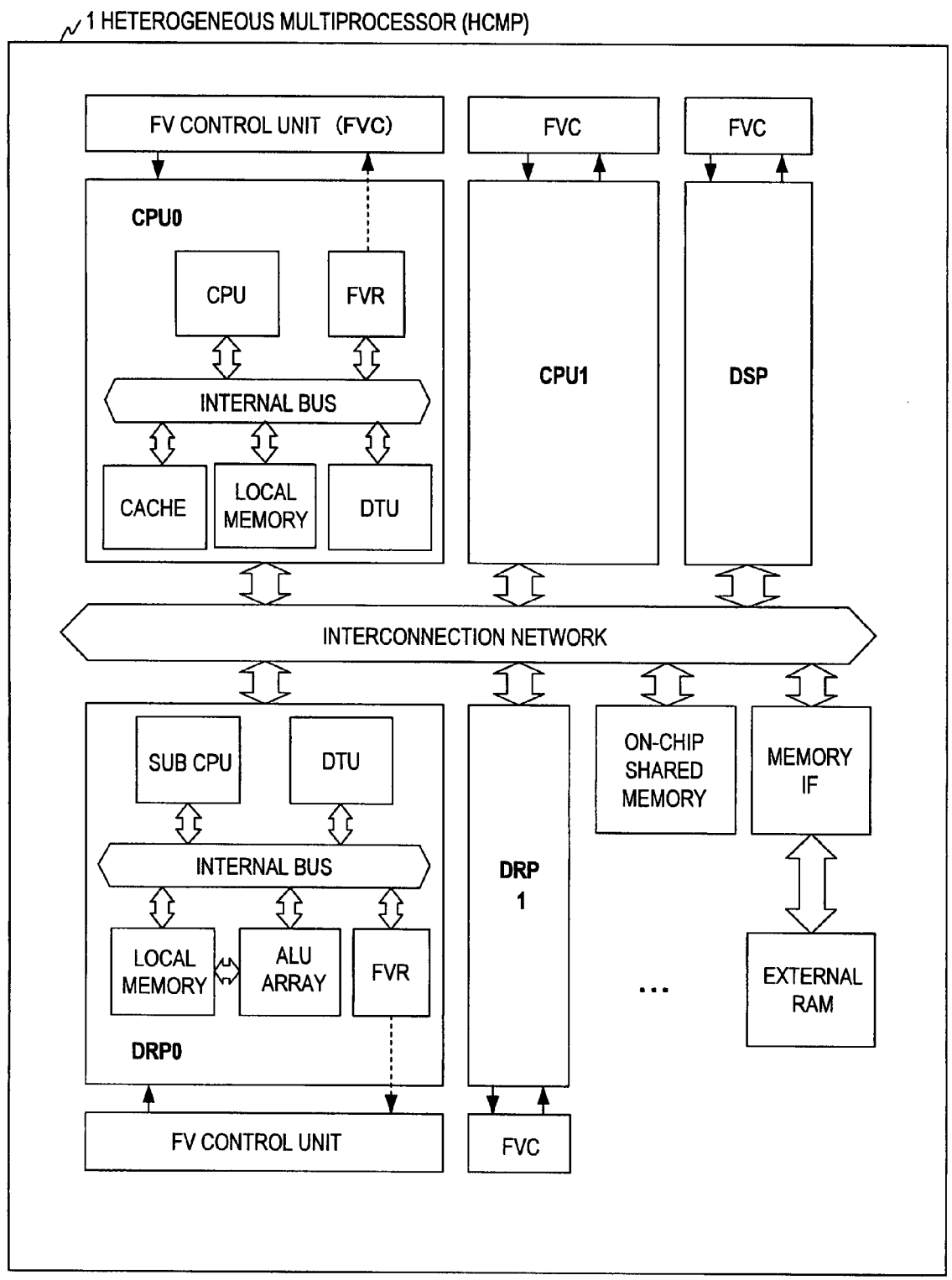
FIG. 1 is a block diagram showing an architecture of a heterogeneous multiprocessor (HCMP1) being a generation target of an execution code.

In other words, according to this configuration information, as shown in FIG. 1, the HCMP1 includes four general-purpose processor CPU's, two signal processor DSP's, and two dynamically configurable processors (DRP's), and each PU holds the local memory. As configuration information, in addition to that shown in FIG. 4, for example, a bus configuration, a type of power mode of each PU, or the like may be designated. For example, as bus network configuration, one or three two-way busses, a ring-shaped bus, crossbar connection, or the like can be represented. There is also an instruction as to a bus transaction system (atomic transaction or split transaction capable of separating a request and a response of a bus). Which bus each PU is connected, or which domain buses it belongs to when a cluster structure is employed, or the like can be designated.

As a type of the power mode, definition of a power control mode such as a clock stop or a power cut-off, or description of effects during power control of each mode is conceivable. The configuration information is necessary for calculating costs of processing time or power necessary when the global compiler executes parallelization scheduling. When program division is carried out for parallelization, information of this configuration file is used because a memory capacity of the PU must be taken into consideration.

(Processing Flow of Global Compiler)

Next, a processing flow of the global compiler 2 in which the code generation compiler 210 and the parallelization compiler 211 for each processor are associated with each other to convert the input program 200 into execution codes 206 executed in parallel in the heterogeneous multiprocessor (HCMP) 1 will be described. First, the input program 200 is processed sequentially by a plurality of code generation compilers ACCPL 210 for various processors which have been prepared for types of PU of the HCMP1. Especially, as a dedicated processor of the HCMP1 is different in instruction set from a normal CPU, processing costs necessary during parallelism scheduling must be estimated separately. Because an efficiently processable program structure is frequently limited depending on the type of PU, information necessary for the parallelization compiler 211 of a next stage is generated by executing processing at the code generation compilers ACCPL 210 for various processors which have been prepared for types of processors of the HCMP1.

The heterogeneous multiprocessor 1 can include a plurality of general-purpose processors different from one another in instruction set. In this case, as efficiently processable program structures are different depending on architectures even for the general-purpose processors, various pieces of information such as execution time can be generated for the program structure.

In other words, the ACCPL 210 obtains designation of optimal processing portions at various processors and processing time (processing cost=number of execution cycles) when processing is carried out by the various processors of the processing portions to add them as pieces of target processor information to the input program 200. An output of the ACCPL 210 at this processing stage is a program 201 having the information added to the input program 200. For the target processor information, in place of being added to the input program 200, in addition to the information, information indicating a position of the input program 200 with respect to the information may be separately generated by a file or the like (209). For a program portion having a processor decided beforehand in a fixed manner through user's processing designation made beforehand, an execution code 205 for this processor can be separately generated at this stage, and the execution code can be linked after the parallelization scheduling to be set as an execution code for the HCMP1.

Then, the parallelization compiler (PRLCPL) analyzes the program structure by using a processing result (target processor information added program) 201 of the ACCPL 210, divides the program, extracts parallelism of divided program units (tasks), obtains costs when processing is executed by a normal CPU, and allocates tasks of processing to be simultaneously executed based on the parallelism so that the entire processing time of the plurality of PU's can be shortened. In this case, for a portion to be processed by the dedicated processor of the HCMP1, information added to the input program 200 is utilized and, if it can be judged that the entire end time is quickened by allocating processing to the dedicated processor, tasks are allocated to the dedicated processor.

If it can be judged that the process is made faster by processing through the normal CPU when the dedicated processor is congested because of restrictions on dedicated processor resources, tasks are allocated to general-purpose processors. As a result of scheduling, a directive being a task eyemark, and a directive (parallelization information) indicating a PU to be processed are inserted/added to the input program 201 corresponding to each divided task by the parallelization compiler. A directive indicating a memory arrangement in the HCMP1 of data used for the program corresponding to each task is also inserted together.

Subsequently, the input program 202 to which the directives indicating the task division and arrangement have been added generates an execution code of each PU by executing processing again at the dedicated processor compiler ACCPL 210 for each PU type including the general-purpose processor CPU and the dedicated processor. Because the PU to be processed is specified in the program input to the ACCPL, the code generation compiler for each PU only needs to analyze a portion alone whose processing is designated at the PU targeted by each compiler, and to convert it into an execution code 203.

To optimize the entire scheduling, compiler information 208 such as scheduling information generated by the parallelization compiler PRLCPL 211 and compiler information 207 containing more accurate cost information obtained as a result of generating the execution code based on the scheduling by the parallelization compiler PRLCPL 211 at the ACCPL 210 can be input to the parallelization compiler PRLCPL 211 (221) to execute scheduling again. When optimization of the execution code is executed more deeply in the HCMP1, optimization of the entire program is executed by repeating this processing (210).

Figure 2B:
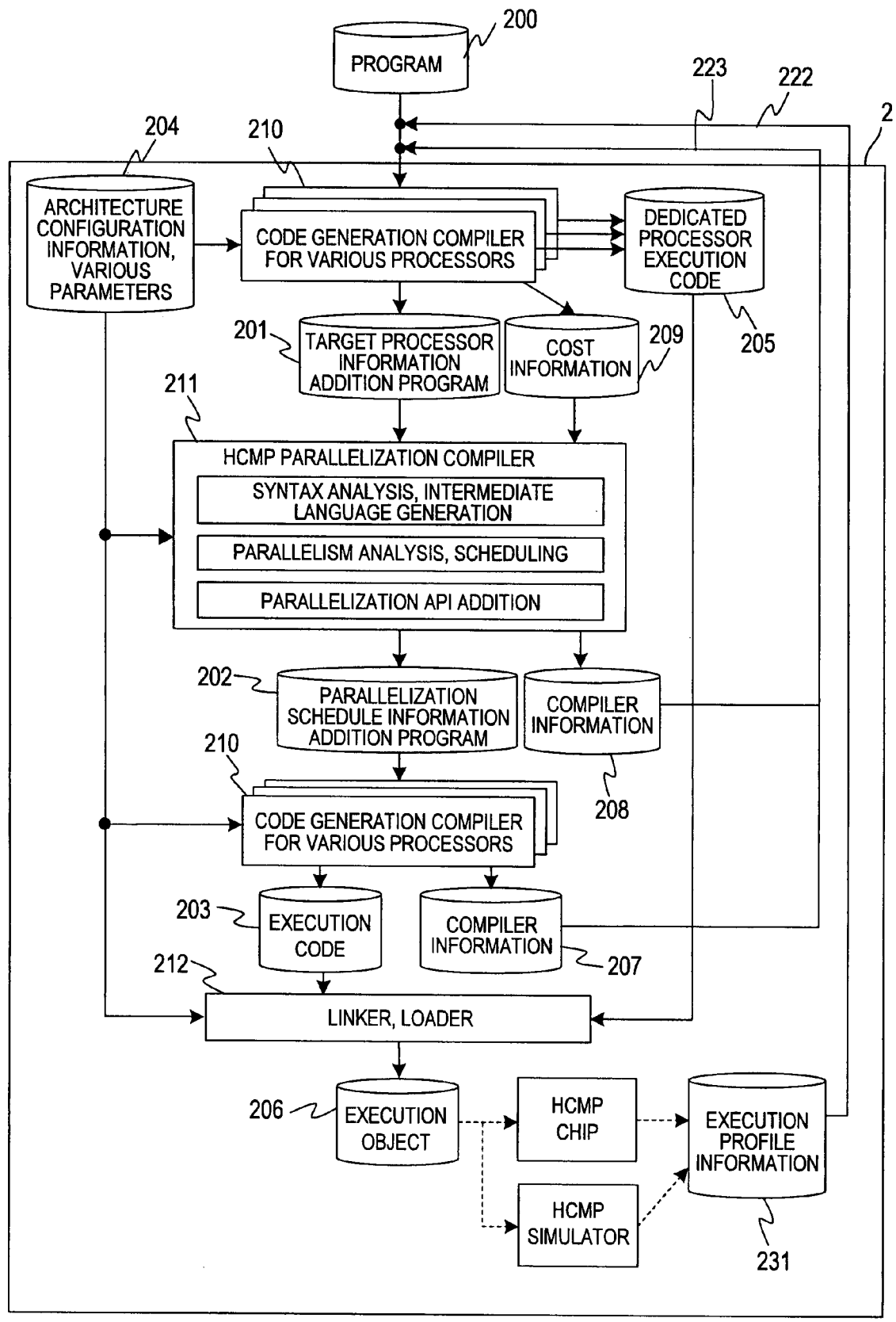
FIG. 2B is a flowchart showing another example of a processing procedure of the global compiler for the HCMP1.

As shown in FIG. 2B, the pieces of compiler information 207 and 208 can be input to the code generation compiler 210 for various processors positioned at an initial processing stage of the global compiler 2 (223) to execute task extraction and execution time evaluation for various processors again by the code generation compiler 210.

When a memory position of each program or data in the HCMP1 is designated by the linker 212, and use of the execution code generated at the dedicated processor compiler ACCPL 210 of the first stage is designated to an output program 202 of the parallelization compiler 211, the execution code 203 generated by the ACCPL 210, including the execution code, is merged as an execution code (object) 206 for a single HCMP1. The execution object 206 is set in a disk device or an off-chip shared memory (CSM), and a program of each PU is read into each PU by loading an object code during execution to start execution.

Pieces of information such as task execution time, data transfer time, bus utilization time, power control effects, and a cache mistake rate obtained as a result of executing processing in the real HCMP1 chip or HCMP simulator can be collected as execution profile information 231 to be used for next compilation. In other words, the optimization of the entire scheduling can be executed for the purpose of further shortening execution time or lowering power consumption by inputting the execution profile information to the parallelization compiler PRLCPL 211. As shown in FIG. 2B, the compiler information profile information 231 can be input to the code generation compiler 210 for various processors positioned at the initial stage of the global compiler flow (222) to be used for task extraction and execution time evaluation for various processors by the code generation compiler 210.

(Compile Flow Using Library for Various Processors)

Various processors convert the written program into an execution code for each processor by the code generation compiler 210 for each processor, and process the execution code. However, depending on a dedicated processor, a code generation compiler for converting a program into an execution code is not always prepared. For example, in a processor such as a signal processor (DSP), it is difficult to convert a program written in a normal C language into a DSP execution code.

Generally, a form is employed in which an execution code for realizing a certain function is written beforehand as a library by an assembly or the like without using a compiler, and the library is loaded when a user uses the processor. A control operation in which data is supplied to a dedicated processing circuit which does not interpret a program normally and defines an operation in a hardware manner to start processing is defined as a library.

Figure 2C:
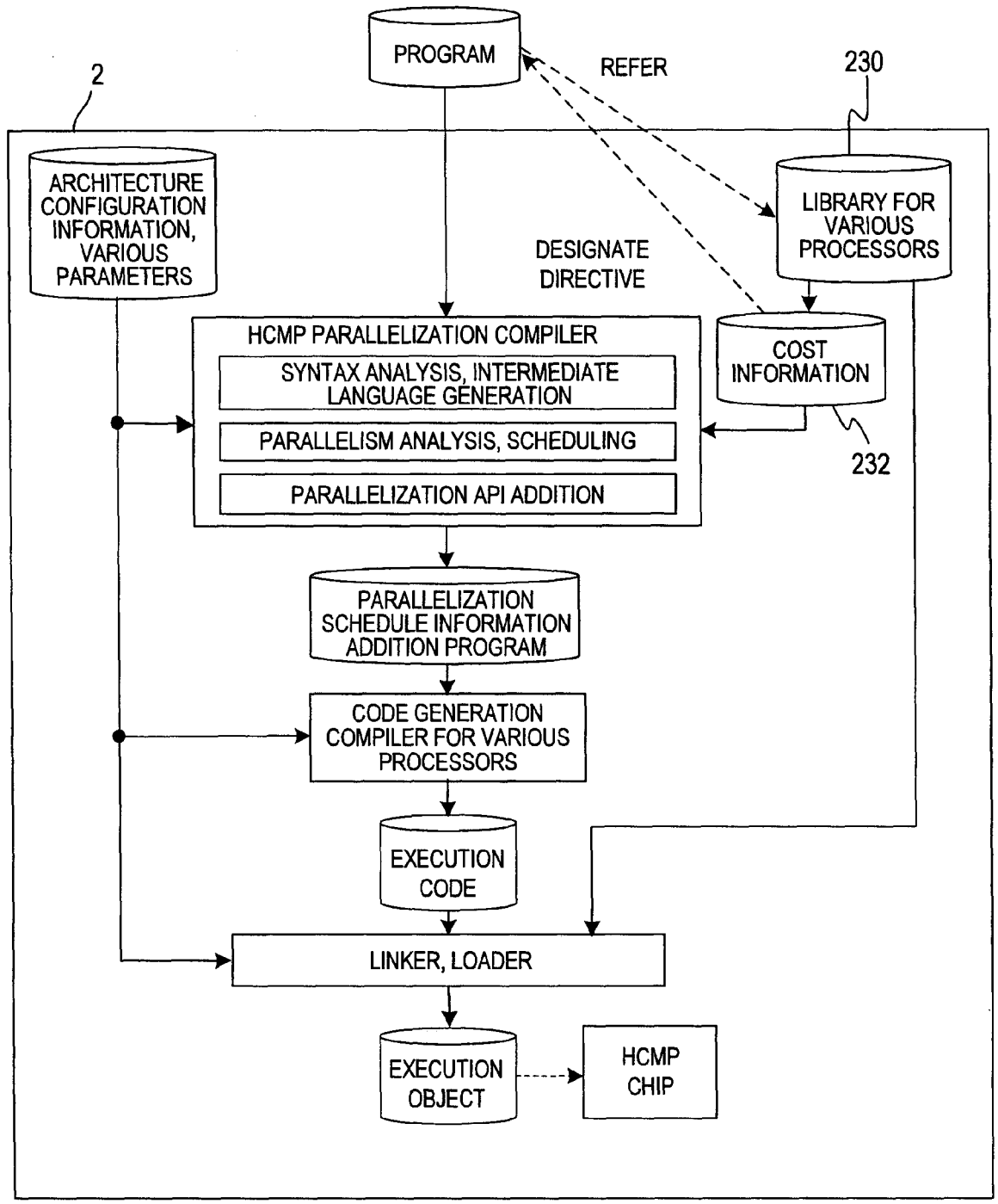
FIG. 2C is a flowchart showing yet another example of a processing procedure of the global compiler for the HCMP1.

Thus, the global compiler 2 can deal with the case of using various processors on the library base. Specifically, as shown in FIG. 2C, a library 230 for various processors is introduced.

The library 230 stores an execution code and a control code for various processors, and cost information 232 of execution time of the processing. The user can load the library 230 in the form of a subroutine call in the program 200. For example, in an input example of FIG. 3, data can be written as in the case of a subroutine call 301 of "func3". In this case, the cost information 232 is clearly specified in a program by a directive as in the case of "#pramgan HCMP assign dsp" (300) of FIG. 3, or the parallelization compiler PRLCPL 211 of a subsequent stage refers to the cost information 232 of the library for various processors. Processing of the parallelization compiler 211 and after are similar to the flow of FIGS. 2A and 2B.

(Processing Flow of Compiler for Various Processors)

Figure 5A:
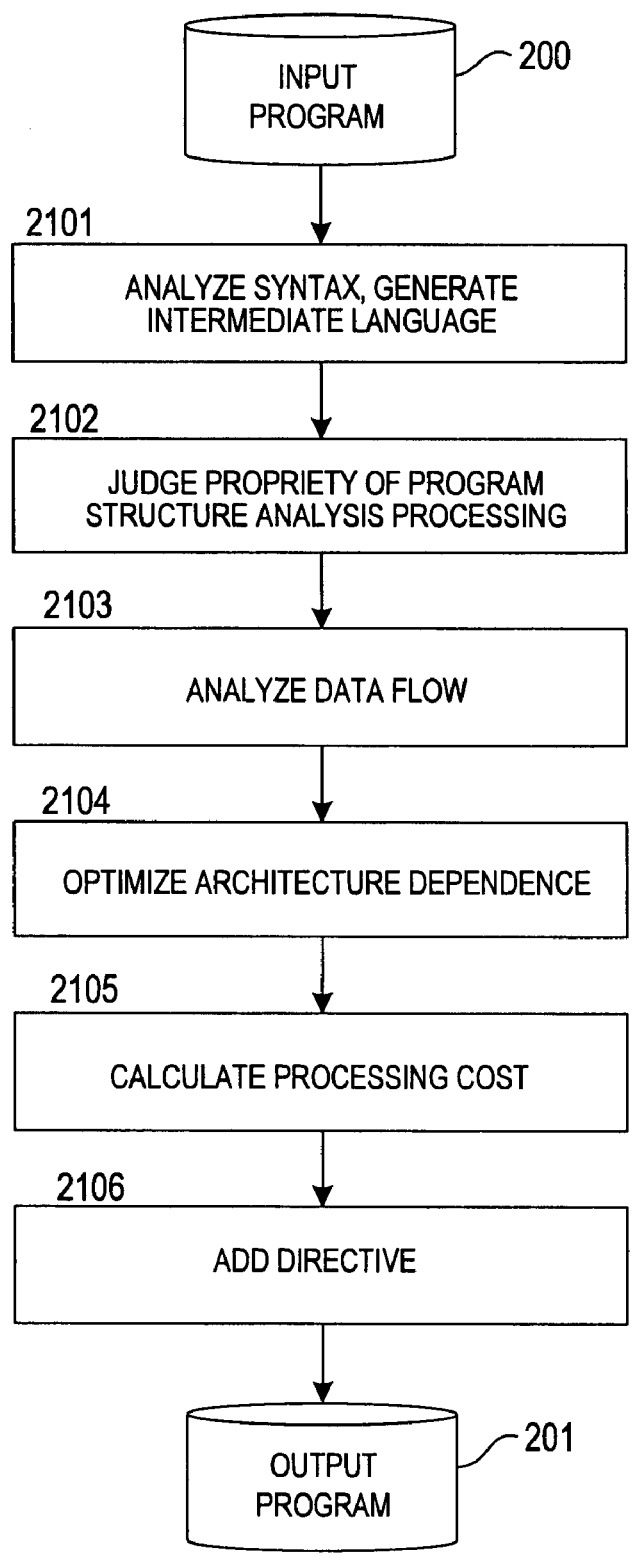
FIG. 5A is a diagram showing a code generation compiler for various processors.

The processing flow of the global compiler for the HCMP1 has been described. Next, a processing procedure of the compiler ACCPL 210 for various dedicated processors will be described. FIG. 5A shows a processing flow of generating an output program 201 of the ACCPL 210 to be input to the parallelization compiler PRLCPL 211.

An example of a dedicated processor such as a DRP will be described below as a processor. The ACCPL 210 first analyzes a structure of a program 200, calculates variables in the compiler, and generates an intermediate code divided into control structure units (2101). Then, focusing on the analyzed program structure, especially a control structure such as a loop, dependence between iterations of a calculation data flow in the loop is analyzed to judge whether the loop can be continuously and efficiently processed in the target PU (2102 and 2103). For example, in the case of the DRP described in Non-patent Document 1, it is constituted of an ALU array of 8×4, and efficient processing can be carried out by using 8×4 calculators in parallel in a longitudinal direction and in a pipeline processing manner in a horizontal direction. In other words, if there is parallelism between loop iterations, a plurality of iterations can be processed all at once in one surface of the ALU array by dividing the ALU array in the longitudinal direction. If there is parallelism between statement levels such as directives in the loop, a plurality of statements can be processed all at once by dividing the calculators by statement units in parallel in the longitudinal direction. If there is data dependence between statements, by mapping calculation to utilize the horizontal direction of the ALU array in a pipeline manner, a large speed improvement can be obtained for a CPU which advances instructions and data by one or some. Accordingly, in the steps 2102 to 2104, optimization is carried out according to the architecture of the dedicated processor.

When there is user's directive in the input program 200, this directive is analyzed together. As the directive, there is a directive which instructs the user to execute processing by a specific dedicated processor of the HCMP1. In other words, for example, if the ACCPL 210 is a DRP code generation compiler, and a certain program block as a directive designates processing in the DRP by the user, the block is treated as a DRP processing unit. That is, in a place designated by the directive (it may be designated by a program structure unit such as a loop or a subroutine, or by a directive before/after the DRP processing unit), it is treated to be processed by the DRP, and processing costs and an execution code of the block are generated.

Subsequently, for the block judged to be processable by the PU, processing costs when the block is processed by the PU are calculated based on an optimization result of the architecture of the PU at the intermediate code level (2105). A method for calculating processing costs varies from one architecture to another of the PU. In a normal processor type, costs are calculated based on the average number of clocks consumed when a program instruction is executed. In a signal processor such as a DRP, an accurate number of clocks can be calculated based on the number of cycles of data supplied to the calculator of the data path if an amount of data to be processed is known. If the dedicated processor is a vector calculator, the program vector conversion technology of the automatic vector compiler disclosed in Non-patent Document 2 can be used. According to the vector conversion technique, data dependence analysis of a loop structure is carried out to judge loop vector conversion, and a vector calculation instruction is inserted into a portion to be converted into vector. A method for deciding whether program conversion is possible for vector conversion is enabled by using a data dependence graph disclosed in Non-patent Document 3. Processing costs can be obtained as a number of vector calculation clocks based on a vector instruction or the number of data to be calculated.

As described above, the dedicated processor normally includes a path for continuously supplying data to a plurality of calculator groups, and calculator control and data supply control are carried out by a sequencer and a control processor separately disposed. In other words, data is transferred from the external memory of the dedicated processor such as a CSM or a processor local memory to the memory of the processor. Time for executing control to decide timing for data supplying from the memory of the dedicated processor to the calculator, program supplying for deciding a function of the calculator, a function of the calculator or data supplying is necessary, and the code generation compiler 210 decides processing costs including, for example, data loading time from the CSM to the local memory of the PU, control time necessary for setting a calculator function of the PU, or the like. The calculated processing costs are added as a directive to the input program (2106).

Figure 5B:
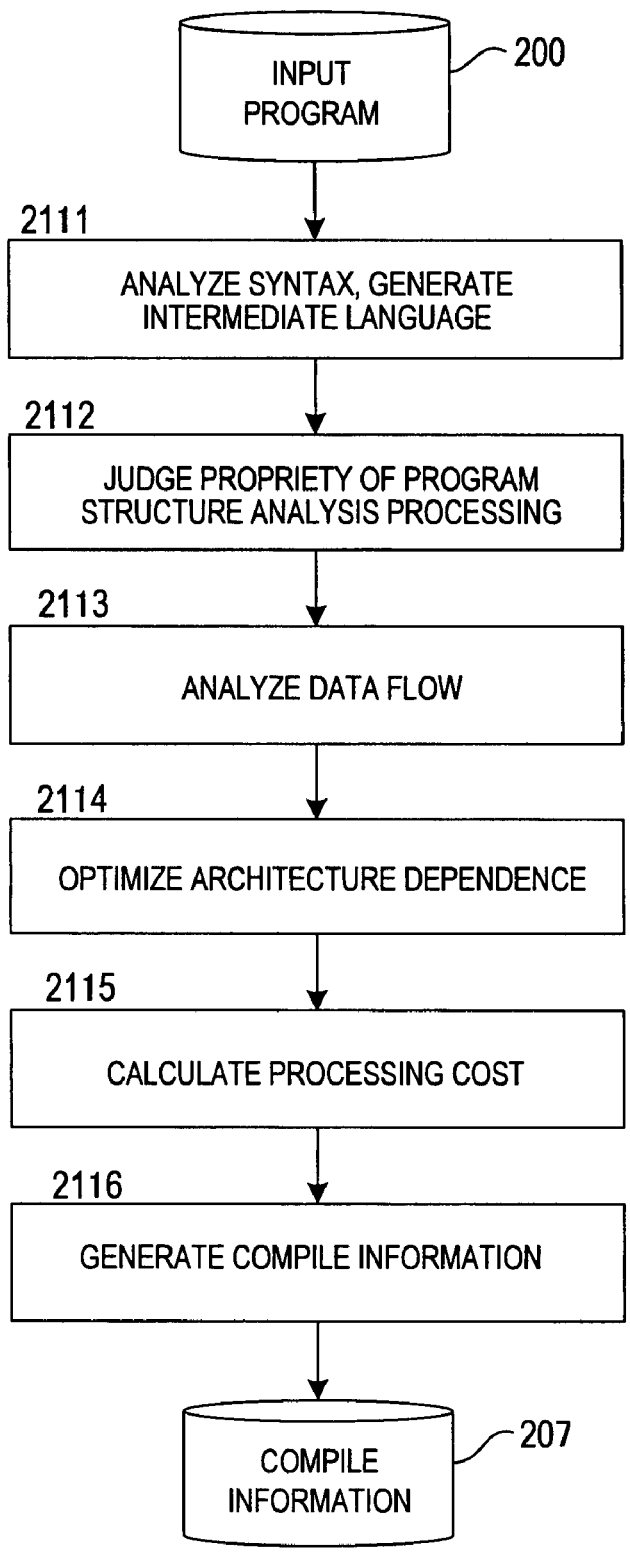
FIG. 5B is a diagram showing a code generation compiler for various processors.

The calculated processing costs may be separately output as compiler information 207. Steps 2111 to 2116 of FIG. 5B constitute a processing flow of generating the compiler information 207. The compiler information 207 is used for processing (220) of the parallelization compiler PRLCPL 211 executed again to optimize the entire program as described above.

Figure 5C:
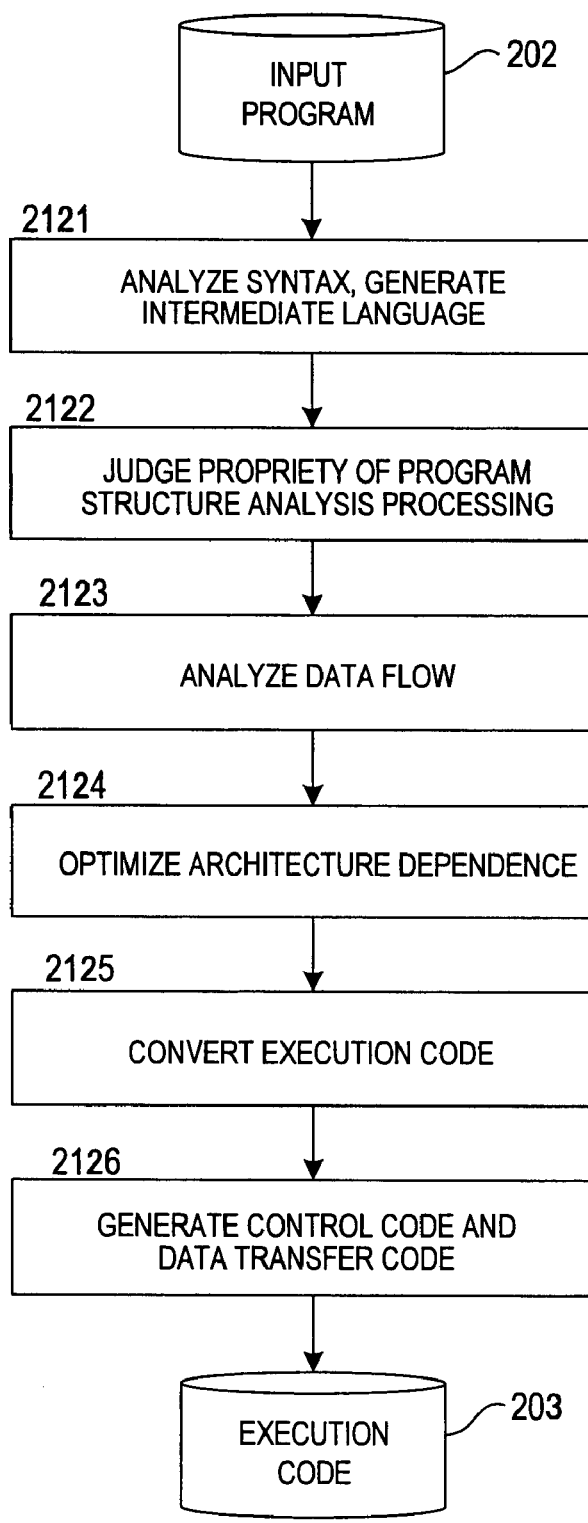
FIG. 5C is a diagram showing a code generation compiler for various processors.

The code generation compiler 211 not only adds the information of costs or the like to the input program 200 but also generates a processor execution code and data transfer/dedicated processor control code. Steps 2121 to 2126 of FIG. 5C constitute a processing flow of the code generation compiler for various processors.

(Program Output From Compiler for Various Processors)

An input program input to the code generation compiler 210 for various processors and analyzed according to the processing procedure shown in FIG. 3 will be described first. There are directives of some users in the input program of FIG. 3. The directive starts from a line starting with a keyword "#pragma hcmp". "#pragma hcmp assign dsp" 300 indicates that a subroutine "func3 (d, e, f)" (301) immediately after the directive allocates processing to the DSP. In other words, the subroutine indicates that processing can be executed in the DSP and the user designates processing of the DSP. When the parallelization compiler judges that end time comes earlier for processing by the normal CPU, for example, because of ongoing execution of another task by the DSP, even if this directive is received, processing may be executed by the CPU after all, and the processing is not always executed forcibly by the processor designated by the directive. Portions surrounded with "#pragma hcmp assign drp process_a_01" 302 and "#pragma hcmp assign process_a_01" 303 indicate allocation of processing to the DRP. A tail end of the directive is a unique ID designated by a user. As in the case of the aforementioned example, there are a method for designation by a structure unit for a loop or a subroutine, and a method of designating start and end points by a directive.

FIG. 6 shows a result of processing the input program 200 first by the DSP code generation compiler. In the DSP code generation compiler, a block to be processed by the DSP based on a program structure is specified, and costs obtained when the block is processed by the DSP are inserted into the input program. For example, "#pragma hcmp exec dsp exec_cyc=700,000 data=20,000" 310 of FIG. 6 indicates processing costs calculated by the DSP code generation compiler for the DSP processing block designated by "#pragma hcmp assign dsp" 311 of the next line. "exec_cyc=700,000" indicates that execution time is 700 K cycles, and "data_cyc=20,000" indicates that data transfer time is 20 K cycles.

FIG. 7 shows a result of inputting an output program of the DSP code generation compiler 210 to the DRP code generation compiler to process the output program (201). For example, "#pragma hcmp exec drp exec_cyc=200,000 data_cyc=10,000 config_cyc=3,000" 320 of FIG. 7 indicates processing costs calculated by the DRP code generation compiler for a DRP processing block designated by "#pragma hcmp assign drp" 321. The "exec_cyc=200,000" indicates that execution time is 200 K cycles, the "data_cyc=10,000" indicates that data transfer time is 10 K cycles, and the "config_cyc=3,000" indicates that 3 K cycles are necessary for loading DRP program information (configuration). When it is judged that a certain block can be processed by a plurality of dedicated processors, costs for the dedicated processors capable of executing processing are inserted by a plurality of lines. For example, "#pragma hcmp exec drp" 322 and "#pragma hcmp exec dsp" 323 of FIG. 7 are continuously inserted, and these indicate that a loop of the next line can be executed by both the DRP and the DSP. The parallelization compiler 211 lastly decides a PU to which the loop is allocated based on execution costs of both and a situation of each PU during scheduling.

Through a designation of a global compiler option, the user can explicitly designate a processor to which processing is allocated by "#pragma hcmp assign ***", obtain costs only for this processor, and inserts a directive. FIG. 8 shows a result (cost information 209) of processing the input program of FIG. 3 by this method.

(Processing Flow of Parallelization Compiler)

Figure 9:
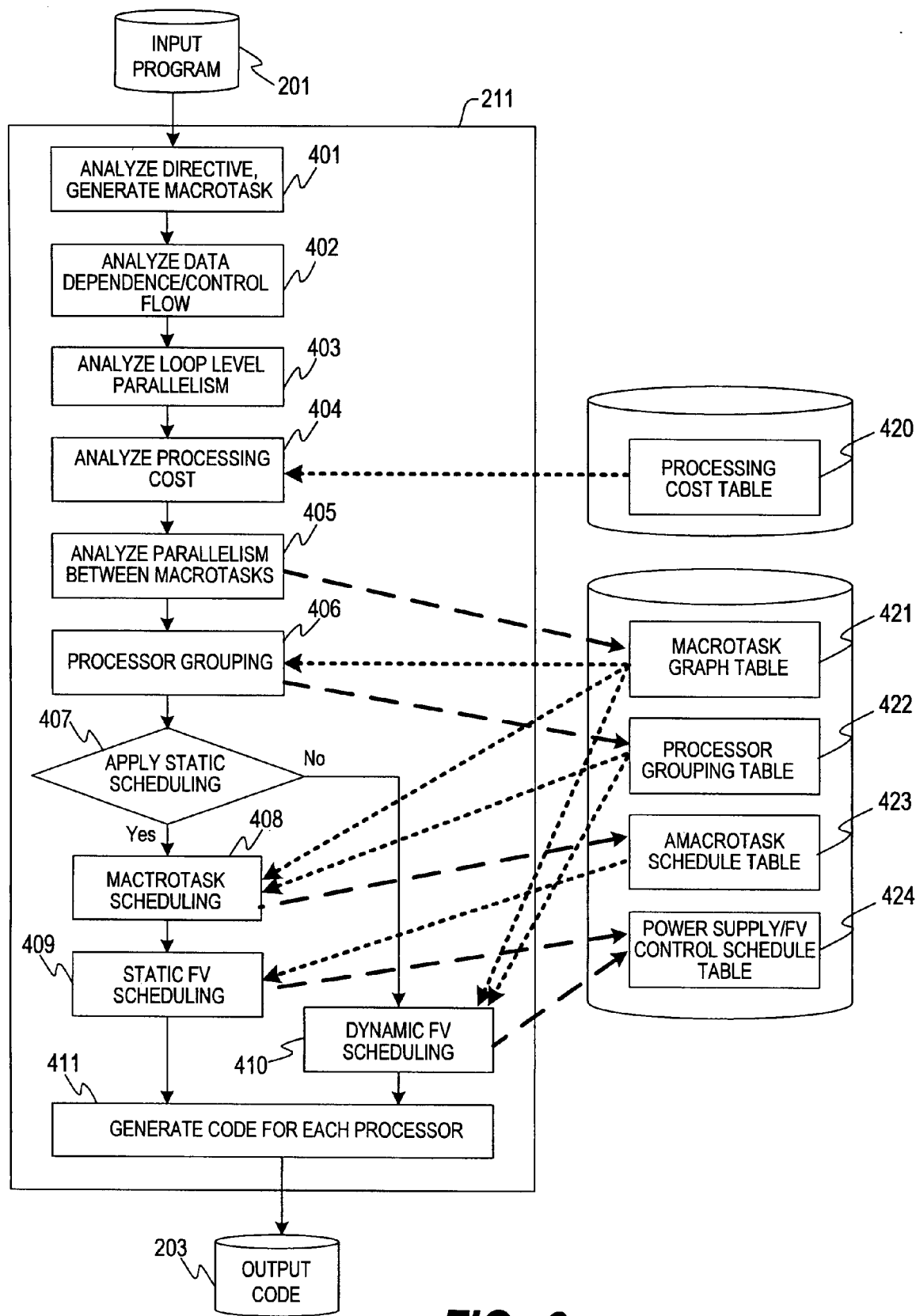
FIG. 9 is a flowchart showing an example of a processing procedure of a parallelization compiler.

Next, a processing flow of the parallelization compiler 211 in the global compiler 2 will be described. FIG. 9 shows a processing flow of the parallelization compiler 211.

(Generation of Macrotask)

According to the input program 201 of a sequential structure written in a high-level language such as a C language or Fortran, the parallelization compiler 211 analyzes a structure of the program to divide it into three kinds of coarse-grain macrotasks (MT) to generate a repetition block (RB), a subroutine (SB), and a block of pseudo assignment statements (BPA) (401). The RB is an outermost loop in tiers of the loop block, and the BPA is a block obtained by combining or dividing a plurality of basic blocks constituted of assignment statements with consideration given to scheduling overhead or parallelism. As in the case of the "#pragma hcmp assign ***" of FIG. 3, a block whose processing at the dedicated processor has been designated is treated as one macrotask.

(Data Dependence/Control Flow Analysis)

Subsequently, the parallelization compiler 211 analyzes a control flow and data dependence between the macrotasks generated by the division to extract an MT execution order relation (402). Since the input program is sequentially described, execution codes of a normal compiler are executed in a sequential order as in the case of the structure of the program. However, between MT's, it is often the case that the execution codes do not need to be always executed in a described order. In other words, if there is no control or data reference dependence between MT's, especially in the multiprocessor system, it is important that a plurality of MT's are arranged in a plurality of PU's and scheduling is carried out simultaneously or by changing an order to shorten the entire execution time. To execute such scheduling, parallelism between the MT's must be analyzed. As a preparation, an execution order relation between MT's is extracted by data dependence/control flow analysis processing 402.

(Loop Level Parallelism Analysis)

Subsequently, the parallelization compiler 211 parallelizes loop levels as parallelism analysis of middle grain size levels in the macrotask (403). In the loop level parallelization 403, data dependence between loop iterations is analyzed to judge whether each iteration can be independently processed. If possible, the iterations are allocated to the plurality of PU's to be processed in parallel. Loop parallelization is realized by various methods, for example, a single loop is divided into a plurality of loops to enhance parallelism, data dependence between loops is eliminated by copying data or extending array variables to realize parallelization, and a plurality of loops are combined into a single loop to reduce overhead necessary for loop control.

(Processing Cost Analysis)

Next, the parallelization compiler 211 obtains a processing cycle necessary when the generated macrotask MT is executed by each PU from preadded directive information. For a processing cycle of the CPU, it is normally obtained by referring to a CPU instruction cost table in the parallelization compiler (404). As a method of estimating CPU processing costs, for example, regarding the CPU, the number of cycles necessary for instruction levels such as multiplication and addition is held in a table 420, and the number of sequential processing cycles obtained when the MT is executed by the PU can be estimated by referring to the table 420.

If there are elements which inhibit deciding of costs during compilation, for example, if the MT includes a branch, costs are calculated with a branch probability set to 50%. For example, if a loop or array size is not defined, a method of setting loops to a fixed number of times, setting a maximum size during array declaration, or the like is applied.

(Intermacrotask Parallelism Analysis=Earliest Execution Condition Analysis)

Figure 10:
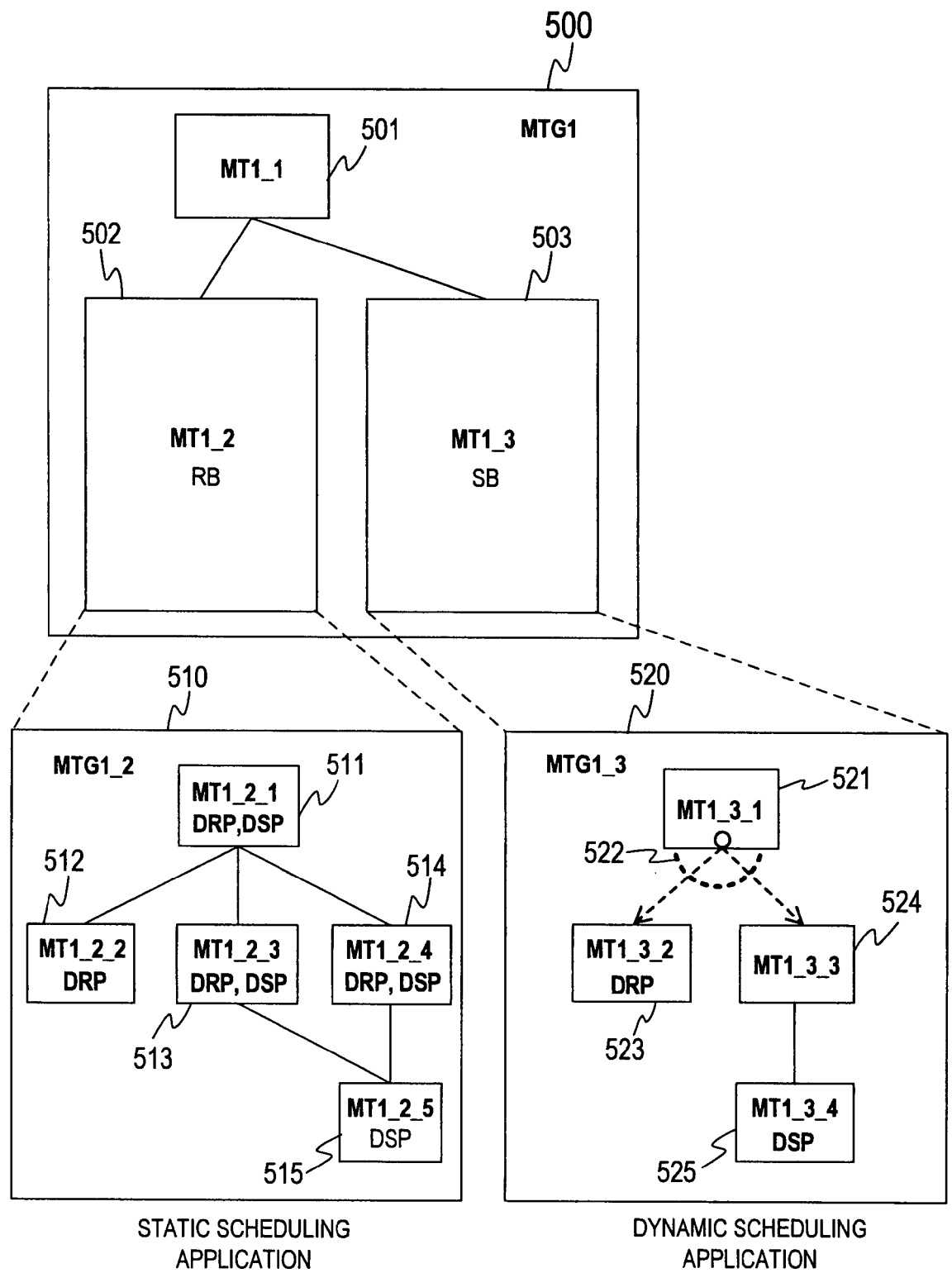
FIG. 10 is a macrotask graph showing a dependency relation between tasks generated by the compiler.

After the processing costs of the macrotask MT have been decided, the compiler 211 decides parallelism between MT's, i.e., a condition (earliest execution condition) for implementing execution of each MT earliest, from the simultaneous analysis results of the control flow and the data dependence between the MT's extracted in the data dependence/control flow analysis processing (405). It is a macrotask graph (MTG) that visibly shows this earliest execution condition graphically. FIG. 10 shows an MTG generated by analyzing the input program 200 of FIG. 3. The parallelism analysis result between the macrotasks is held as a macrotask graph table 421 in an external storage device to be used for compilation processing of a subsequent stage.

(Explanation of Macrotask Graph)

The macrotask graph MTG will be described below. Each node in the graph indicates a macrotask MT, the solid line between the nodes indicates a data dependence relation, the broken line between the nodes indicates a control dependence relation between the macrotasks, and a small circle in the node indicates a condition branch. For example, the solid line extends from MT1_1 (501) to MT1_2 (502) and MT1_3 (503), which indicates a dependence relation in which the MT1_2 and MT1_3 execute processing by using data generated as a result of executing the MT1_1 as input data. Accordingly, as an execution order, after the MT1_1 task is finished, the MT1_2 and the MT1_3 can be executed.

As the MT1_2 (502) of the input program 200 is a block constituted of a plurality of loops or subroutines, the compiler further divides the MT into a plurality of MT's in a tiered manner. Thus, in the MTG, an MTG of another tier is formed in the MT1_2. The same applies to the MTG1_3 (503).

Focusing on an MTG (510) in the MT1_2 (502), the solid line extends from MT1_2_1 (511) to MT1_2_2 (512), MT1_2_3 (513), and MT1_2_4 (514). Accordingly, these three tasks 512, 514, and 515 can be simultaneously executed after the MT1_2_1 (511) is finished. Since the solid line extends from the MT1_2_3 (513) and the MT1_2_4 (514) to the MT1_2_5 (515), the MT1_2_5 (515) can be executed after execution of both the MT1_2_3 (513) and the MT1_2_4 (514) is finished. Thus, a parallel order relation is established for the MT1_2 before execution, and scheduling can be statically carried out during compilation. In other words, an execution order of the tasks in the PU is decided during compilation.

Focusing on an MTG (520) in the MT1_3 (503), there is a small circle in MT1_3_1 (521), which indicates that the task MT1_3_1 (521) includes a branch condition. The arrow broken line extends from the small circle to MT1_3_2 (523) and MT1_3_3 (524) and, as a dotted-line arc 522 indicating an OR condition of control dependence overlaps them, the condition is branched to one of MT1_3_2 and MT1_3_3. The broken line indicates a control dependence relation for establishing task execution and a condition when data-dependent tasks are not executed. The arrow broken line indicates that the procedure is identical to the control procedure (i.e., original) obtained in the data dependence/control flow analysis (402). In the branch condition of the MT1_3_1 (521), a branch direction is not established unless the task MT1_3_1 is executed, and thus scheduling must be carried out according to a situation during the execution.

(Processor Grouping)

Then, the compiler refers to the generated MTG table 421 to execute processor grouping targeting general-purpose CPU's by taking PU resources of the HCMP1 into account according to a shape or parallelism of the macrotask graph or a designation from the user (406). A dedicated processor group of the DSP, the DRP or the like is not included in the group, and tasks are properly allocated to the dedicated processor group when necessary in processing at each group.

That is, shapes and parallelism of MT's of higher tiers represented by the MTG, e.g., the MT1_2 (502) and the MT1_3 (503), are analyzed, PU's necessary for processing the MT's are grouped, and MT's are allocated to the group. One group becomes a set which includes general-purpose processors (CPU's) for controlling specific-purpose processors (DSP, DRP, and BMP) in the group. For example, in the case of scheduling in the configuration of the HCMP1 shown in FIG. 1, the number of CPU's is two, and thus the MT1_2 and the MT1_3 are grouped into one CPU. The tiered task group in the MT1_2 and the MT1_3 is basically allocated to the grouped CPU. In this case, if there is a designated dedicated processor, the end time of a task is judged to be earlier than that of the CPU when the task is processed by the dedicated processor, and when the processing time of all the tasks in the group can be judged to be shortest, processing is allocated to the designated dedicated processor.

(Static Scheduling and Dynamic Scheduling)

The compiler 211 then judges static or dynamic scheduling as a scheduling method (407). Each scheduling method will be described below in detail, but first described briefly. In a case of an MT flow in which there is no MT condition branch and an earliest execution condition can be decided beforehand, the former static scheduling is applied. The compiler schedules MT's in advance and inserts synchronization codes between tasks during compilation. On the other hand, in a case of an MT flow in which there are unpredictable factors during compilation such as an MT condition branch or fluctuation of MT processing time during execution, the latter dynamic scheduling is applied. The compiler generates a scheduling program for executing control according to a situation of a branch or the like during execution to execute the program by the CPU, and allocates tasks during execution.

(Static Scheduling)

First, a processing flow of static scheduling will be described. In the static scheduling, allocation and an execution order of MT's are decided during compilation. Accordingly, in macrotask scheduling processing 408, pieces of information of the macrotask table 421 and the processor grouping table 422 are referred to, to generate control information for synchronizing execution tasks, starting other tasks between the PU's, or the like, thereby deciding insertion places of the pieces of information. Further, data transfer information for loading data necessary for a task program or a task from the LM or the shared memory SM of another PU to the local memory of the PU is generated together. By such data localization method, the local memory is effectively used to minimize a data transfer amount. Schedule information generated through this processing is held as a macrotask schedule table 423 in the external storage device.

Subsequently, the compiler executes static FV scheduling processing 409. This processing generates a power supply control code for cutting off power, stopping a clock, reducing a clock to lower a power supply voltage, or the like for a portion in which the PU becomes idle as a result of task parallelization scheduling.

(Dynamic Scheduling)

Next, a processing flow of the dynamic scheduling will be described. During the dynamic scheduling, scheduling contents cannot be decided during compilation because of indefinite elements such as a branch condition in the MT. Accordingly, the compiler generates a scheduling program for dynamically executing scheduling based on the MT processing result during program execution (410). This program starts or synchronizes the MT's based on the processing result, and loads data necessary for the MT's. Additionally, based on a FV control concept during task parallelization execution shown in FIG. 18, an operation mode for deciding an operation frequency/supply voltage of the PU is set. The generated scheduling program is held as a power supply/FV control schedule table 424 in the external storage device.

(Generation of Scheduling Code)

Through the aforementioned processing, the compiler completes the scheduling of the PU of the input program. The pieces of scheduling information generated by the processing are held as tables (421 to 424) in the external storage device. The compiler accesses the tables (421 to 424) to read the task execution order, the data transfer information, and the FV control information, and adds a control code (scheduling code) to the static schedule portion and a scheduling program to the dynamic schedule portion in the input program (411).

(Result of Scheduling)

Figure 11:
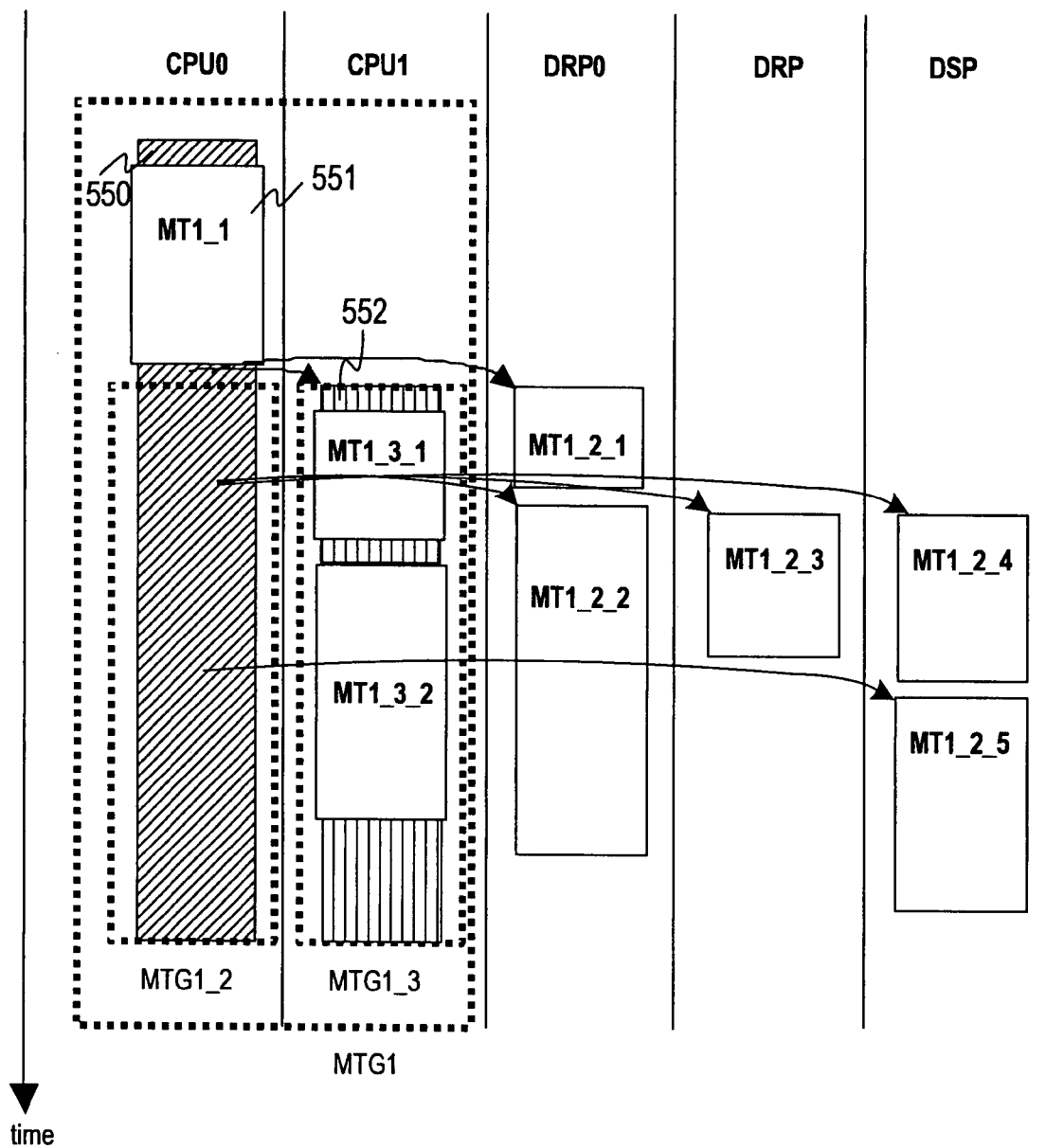
FIG. 11 is a time chart showing a result of HCMP task scheduling.

FIG. 11 shows an example of the scheduling. In FIG. 11, an MT scheduling result is indicated by a time axis for each PU. The hatched oblique line shown in FIG. 11 indicates a synchronous code buried by the static scheduling, and the hatched longitudinal line shown in FIG. 11 indicates a scheduling code generated by a dynamic scheduler to allocate a task. In this example, since a CPU0 manages starting or synchronization of tasks and FV power control, a control code 550 generated by the compiler is first loaded to the CPU0. The control code first starts the MT1_1 in the CPU0. After processing of the MT1_1 is finished, a control code 551 generated by the compiler is executed. Tasks to be processed next are MT1_2_1 and MT1_3_1 designated by the MTG of the lower tiers of the MT1_2 and the MT1_3. The former is executed by the CPU0, while the latter is executed by the DRP0.

As described above, since the MTG1_2 includes no branch condition, scheduling has been executed during compilation (static scheduling), and MT's have been scheduled to the CPU0, the DRP0, the DRP1, and the DSP0. As the MTG1_3 includes a branch condition, a program for scheduling during execution is added, and MT's are allocated to the CPU1 and the dedicated processor group of the DRP and the DSP when necessary depending on an execution result.

Scheduling of the MT group of the MTG1_2 will be described. The processing end of the MT1_2_1 is notified to the CPU0 simultaneously when the execution of the MT1_2_1 is finished in the DRP0. The control code of the CPU0 starts the MT1_2_2 in the DRP0, the MT1_2_3 in the DRP1, and the MT1_2_4 in the DSP. The task of each PU notifies its end to the CPU0 simultaneously with the processing end. An unprocessed task is MT1_2_5 at a point of this time. The MT1_2_5 is a DSP processing task, and the MT1_2_2 is started in the CPU0 after the end of the MT1_2_4.

The MT group of the MTG1_3 will be described. Since the MT1_3 has a branch therein, a branching direction is not known unless a task is executed. Accordingly, a dynamic scheduler 552 for managing loading of a task or data, starting or synchronizing of tasks, and a power control code according to a situation during execution is executed by the CPU 1. The scheduler 552 first starts the MT1_3_1 in the CPU1 to execute it. In the example, assuming that the process branches to the MT1_3_2 as an execution result of the MT1_3_1, processing can be performed more efficiently if execution is carried out at the DRP under normal conditions because the MT1_3_2 is a DRP execution task. However, since the DRP0 and the DRP1 execute the tasks of the MT1_3 during allocation of the MT1_3_1, execution at the DRP0 or the DRP1, or execution at the CPU 1 though efficiency is lower after the end of the task is decided by obtaining an expected end time. In the example, it is judged that the end time is earlier for execution at the CPU 1 because of ongoing task execution of the DRP, and the task is allocated to the CPU 1.

According to this invention, in the multiprocessor system in which various PU's are integrated, by the compiler for dividing and arranging the program to efficiently operate the PU's and generating the control code, it is possible to execute efficient processing with lower power while making maximum use of the performance of the processor system. A software developer can efficiently create a program within a short period of time without being aware of the processor configuration. As a result, this invention can be applied to the LSI for a car navigation system, a mobile phone, or an information home electronic device strongly required of high calculation performance and low-power processing, and the functions of high-quality moving image or voice processing, image recognition or voice recognition can be realized. This invention can also be applied to the LSI for an information system or the control system of an automobile, and an automatic driving, safe driving system, or the like can be realized. Further, in the future, this invention may be applied to a supercomputer in which lower power is essential while extremely high calculation performance is provided.

While the present invention has been described in detail and pictorially in the accompanying drawings, the present invention is not limited to such detail but covers various obvious modifications and equivalent arrangements, which fall within the purview of the appended claims.

What is claimed is:

1. A global compiler for a heterogeneous multiprocessor, for causing a computer to execute the following processings to extract parallelism from an input program and generating an object program corresponding to a plurality of processor units in a system which includes a single or a plurality of types of processor units, the global compiler comprising the processings of:

analyzing the input program by executing, on the computer, a respective code generation compiler prepared beforehand for each type of processor unit included only within the plurality of processor units to extract program portions to be executed for each processor unit, and generating processing allocated processor information for designating the program portion;

generating execution time information estimating execution time of the extracted program portions at the plurality of processor units when an executable portion is extracted from the input program for each dedicated processor unit;

analyzing the input program to extract parallelism of the input program, and allocating the program portions to the plurality of processor units based on the processing allocated processor information and the execution time information;

outputting the allocated program portions as an output code of each processor unit; and calculating data transfer time between a shared memory of data necessary for each processor unit and a local memory of the processor unit in addition to the estimated execution time obtained by generating the execution time information to generate data transfer time information.

2. The global compiler for a heterogeneous multiprocessor according to claim 1, further comprising the processing of generating an intermediate program having the data transfer time information inserted as a directive indicating data transfer into the input program corresponding to the data transfer time information.

3. A global compiler for a heterogeneous multiprocessor, for causing a computer to execute the following processings to extract parallelism from an input program and generating an object program corresponding to a plurality of processor units in a system which includes a single or a plurality of types of processor units, the global compiler comprising the processings of:

analyzing the input program by executing, on the computer, a respective code generation compiler prepared beforehand for each type of processor unit included only within the plurality of processor units, to extract program portions to be executed for each processor unit, and generating processing allocated processor information for designating the program portion;

generating execution time information estimating execution time of the extracted program portions at the plurality of processor units when an executable portion is extracted from the input program for each dedicated processor unit;

analyzing the input program to extract parallelism of the input program, and allocating the program portions to the plurality of processor units based on the processing allocated processor information and the execution time information; and outputting the allocated program portions as an output code of each processor unit;

wherein the processing of generating the execution time information includes processing of calculating program load time and calculating calculator control time of each processor unit based on a hardware architecture of the processor unit to generate program load time information and calculator control time information.

4. The global compiler for a heterogeneous multiprocessor according to claim 3, wherein the global compiler generates an intermediate program having the program load time information and the calculator control time information inserted as directives indicating the program load time and the calculator control time into the input program corresponding to the program load time information and the calculator control time information.

* * * * *